United States Patent
Schneider

(10) Patent No.: US 8,732,137 B2
(45) Date of Patent: May 20, 2014

(54) SEPARATING CONTENT FROM NOISY CONTEXT IN TEMPLATE-BASED DOCUMENTS FOR SEARCH INDEXING

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 525 days.

(21) Appl. No.: 12/473,928

(22) Filed: May 28, 2009

(65) Prior Publication Data

US 2010/0306217 A1 Dec. 2, 2010

(51) Int. Cl.
*G06F 17/00* (2006.01)
*G06F 7/00* (2006.01)

(52) U.S. Cl.
USPC ............. 707/687; 707/690; 707/692; 726/26; 726/31

(58) Field of Classification Search
None
See application file for complete search history.

(56) References Cited

U.S. PATENT DOCUMENTS

| | | | | |
|---|---|---|---|---|
| 6,021,409 A | * | 2/2000 | Burrows | 1/1 |
| 6,336,117 B1 | * | 1/2002 | Massarani | 707/711 |
| 6,578,078 B1 | * | 6/2003 | Smith et al. | 709/224 |
| 6,757,678 B2 | * | 6/2004 | Myllymaki | 1/1 |
| 6,810,404 B1 | * | 10/2004 | Ferguson et al. | 1/1 |
| 7,062,705 B1 | * | 6/2006 | Kirkwood et al. | 715/205 |
| 7,231,405 B2 | * | 6/2007 | Xia | 1/1 |
| 7,302,426 B2 | * | 11/2007 | Bier | 1/1 |
| 7,685,224 B2 | * | 3/2010 | Nye | 709/201 |
| 2002/0188598 A1 | * | 12/2002 | Myllymaki | 707/2 |
| 2003/0120647 A1 | * | 6/2003 | Aiken et al. | 707/3 |
| 2004/0024848 A1 | * | 2/2004 | Smith et al. | 709/219 |
| 2005/0080846 A1 | * | 4/2005 | McCleskey et al. | 709/202 |
| 2005/0210412 A1 | * | 9/2005 | Matthews et al. | 715/835 |
| 2005/0262089 A1 | * | 11/2005 | Wu | 707/10 |
| 2005/0289103 A1 | * | 12/2005 | Bier | 707/1 |
| 2007/0022072 A1 | * | 1/2007 | Kao et al. | 706/45 |
| 2007/0168465 A1 | * | 7/2007 | Toppenberg et al. | 709/218 |
| 2007/0174238 A1 | * | 7/2007 | Sareen et al. | 707/3 |
| 2007/0214050 A1 | * | 9/2007 | Schoen et al. | 705/14 |
| 2007/0220420 A1 | * | 9/2007 | Sanders | 715/513 |
| 2008/0010311 A1 | * | 1/2008 | Kon et al. | 707/102 |
| 2009/0094137 A1 | * | 4/2009 | Toppenberg et al. | 705/27 |
| 2009/0313706 A1 | * | 12/2009 | Zhang et al. | 726/30 |

OTHER PUBLICATIONS

Bollegala et al, "Measuring the similarity between implicit semantic relations from the web" Apr. 2009, ACM 978-1-60558-487, pp. 651-660.*
Cai et al., Block-based Web Search, 2004, pp. 1-8, ACM 1-58113-881-4/04/0007, Jul. 2004.

* cited by examiner

*Primary Examiner* — Angelica Ruiz
(74) *Attorney, Agent, or Firm* — Lowenstein Sandler LLP

(57) ABSTRACT

In one embodiment, a mechanism for separating content from noisy context in template-based documents for search indexing is disclosed. In one embodiment, a method includes selecting a plurality of documents for index comparison, identifying one or more identical elements found in each of the plurality of documents, and removing the one or more identical elements from consideration in an indexing process of the plurality of documents.

20 Claims, 4 Drawing Sheets

SEPARATING CONTENT FROM NOISY CONTEXT IN TEMPLATE-BASED DOCUMENTS FOR SEARCH INDEXING

TECHNICAL FIELD

The embodiments of the invention relate generally to search indexing and, more specifically, relate to separating content from noisy context in template-based documents for search indexing.

BACKGROUND

In order to provide results in search engine and directory services, these services must index web pages. Improving the accuracy of the indexing process has long been a focus of these search engine and directory services. In particular, improving the signal-to-noise ratio in web pages that are indexed by search engines and directory services is a goal of these services.

One problem involved in the field of search indexing is how to separate extraneous material from the indexed page, such as advertisements, site navigation components, headers, footers, and copyright notices, and so on. In other words, the problem is how to remove context in a web page so that only content is being considered for indexing purposes. Eliminating noisy context improves search results of indexed pages by removing from consideration irrelevant content or content that could produce erroneous results. For example, a search for the term "navigation" related to the field of orienteering may result in many web pages where the term "navigation bar" appears, which theoretically could be a very large number of returned search results.

One current solution to this problem is to parse the document being indexed into discrete semantic units. These semantic units are then analyzed independently to separate content that is relevant for indexing purposes from content that is not relevant. The above solution, however, may not be economically feasible for processing large numbers of documents as it takes time and resources to semantically walk through each individual document to identify irrelevant context. Furthermore, it may result in content being identified as irrelevant when it is actually relevant, depending on the criteria used to identify irrelevancy.

As a result, a mechanism to remove noise provided by context that is not relevant to the content of a document in an efficient and economically feasible way would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
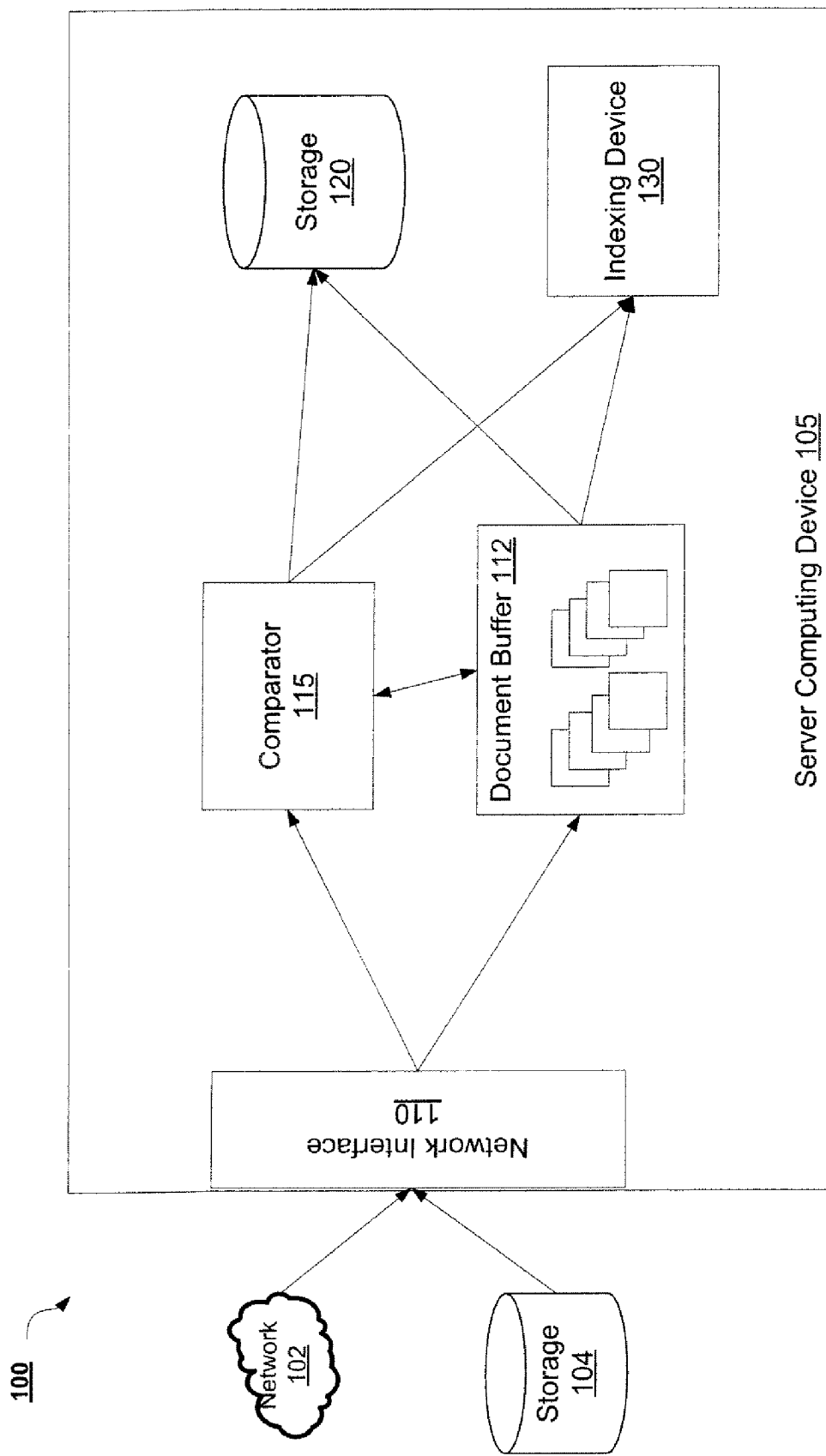
FIG. 1 is a block diagram of a system to separate content from noisy context in template-based documents for search indexing according to an embodiment of the invention.

Embodiments of the invention provide for a mechanism for separating content from noisy context in template-based documents for search indexing. In one embodiment, a method of separating content from noisy context in template-based documents for search indexing includes selecting a plurality of documents for index comparison, identifying one or more identical elements found in each of the plurality of documents, and removing the one or more identical elements from consideration in an indexing process of the plurality of documents.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide for a mechanism to separate content from noisy context in template-based documents for search indexing. Embodiments of the invention improve signal-to-noise ratio in web pages that are indexed by search engines and directory services. In one embodiment, documents of similar origin are compared in order to find template elements that are common between the multiple documents. Any common elements are then removed from consideration for indexing and searching purposes.

FIG. 1 is a block diagram of a system 100 to separate content from noisy context in template-based documents for search indexing according to an embodiment of the invention. In one embodiment, system 100 includes a server computing device 105 with components used to separate content from noisy context in template-based documents for search indexing. In one embodiment, server computing device 105 may include a processor and a memory to implement the components used to separate content from noisy context in template-based documents for search indexing.

In one embodiment, server computing device 105 includes a network interface 110 by which documents are retrieved over a network 102 or directly from storage 104 using a storage device adapter (such as a hard drive or something else). In one embodiment, the documents are web pages. Network interface 110 is connected to a document buffer 112 and a comparator 115.

Document buffer 112 may store multiple documents simultaneously. Document buffer 112 is in turn connected to comparator 115, storage 120, and indexing device 130. One skilled in the art will appreciate that document buffer 112 is not required and some embodiments of the invention may compare documents in real time as they are retrieved, rather than comparing documents from the document buffer 112. In addition, document buffer 112 may store results provided by comparator 115.

In one embodiment, comparator 115 retrieves documents, either directly from network interface 110 or from the document buffer 112, and compares the documents to produce modified document results for indexing. These modified document results are outputted to any of document buffer 112, storage 120, and/or an indexing apparatus 130 for further processing. Although storage 120 is shown as part of server computing system 105, in some embodiments storage 120 may be an independent storage device operating outside of server computing device 105. In one embodiment, comparator 115 compares the documents it receives and removes common elements found in the documents from further consideration in an indexing process.

In embodiments of the invention, common elements may include advertisements, site navigation components, headers, footers, copyright notices, and to name a few examples. For instance, a comparison by the comparator 115 of the content at http://www.press.redhat.com/ with the content at http://www.press.redhat.com/category/brand/ identifies common header and footer information in each web page. Comparing http://www.press.redhat.com/category/brand/ with http://www.press.redhat.com/2009/02/23/open-source-innovation-strikes-again/ identifies the common left-hand navigation bar.

Figure 2:
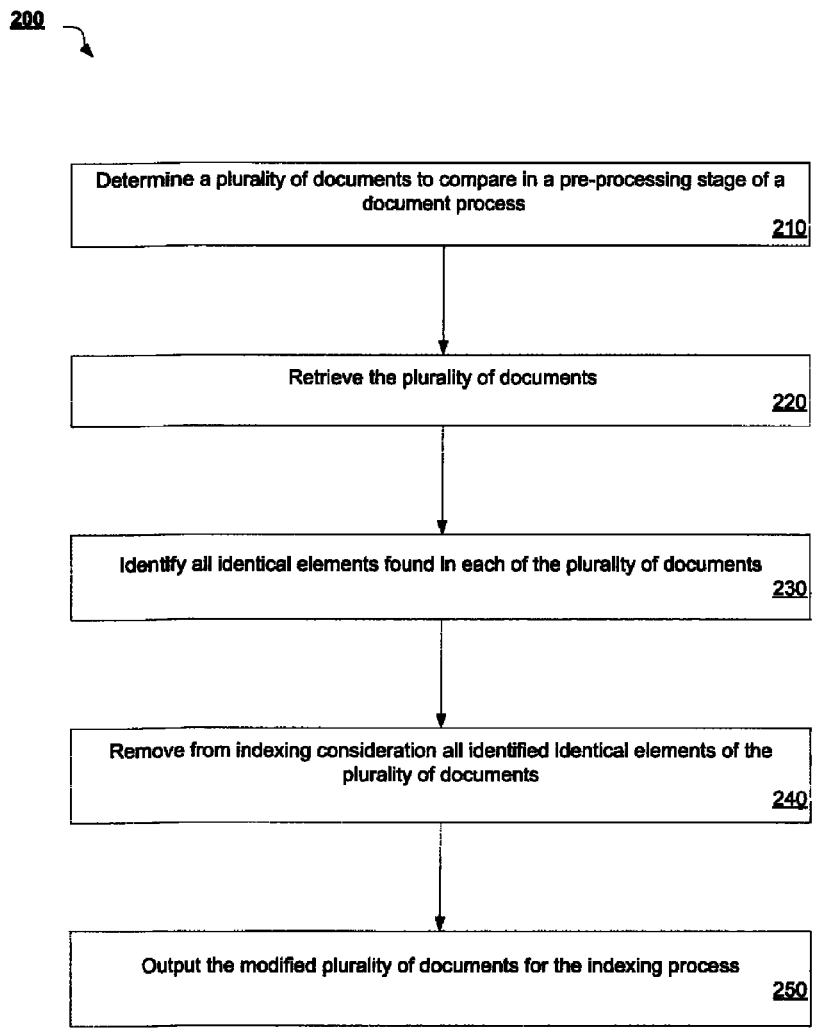
FIG. 2 is a flow diagram illustrating a method for separating content from noisy context in template-based documents for search indexing according to an embodiment of the invention.

FIG. 2 is a flow diagram illustrating a method 200 for separating content from noisy context in template-based documents for search indexing according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by server computing device 105 of FIG. 1. In one embodiment, method 200 is performed as a pre-processing step for a search engine indexing program.

Method 200 begins at block 210 where a plurality of documents are selected for comparison in a pre-processing stage of a indexing process. In one embodiment, the documents are web pages that may be retrieved via a network or directly from storage, such a server computing device. In one embodiment documents are selected for retrieval based on their Uniform Resource Locators (URLs), so that documents with similar URLS are compared. In other embodiments, documents stored on the same server may be compared with one another. One skilled in the art will appreciate that there are a variety of options for selecting documents for comparison and embodiments of the invention are not limited to the above examples.

At block 220, the selected plurality of documents are retrieved by a network interface of a comparator device. In other embodiments, the plurality of documents may be pushed to the network interface. In one embodiment, the plurality of documents are stored in a document buffer of the comparator device. In another embodiment, the plurality of documents are retrieved in real time.

Subsequently, at block 230, all identical elements in the plurality of documents are identified. For example, the plurality of documents may have common header and footer information that does not reliable differentiate the documents in terms of search results. There is a high likelihood of that this identified common header and footer information will not be relevant to the content of the documents, but rather only relevant to the machinery of the document repository or document collection of the documents. At block 240, all identified identical elements are removed from indexing consideration. Lastly, at block 250, the modified plurality of web pages is output to an indexing process for further processing.

Figure 3:
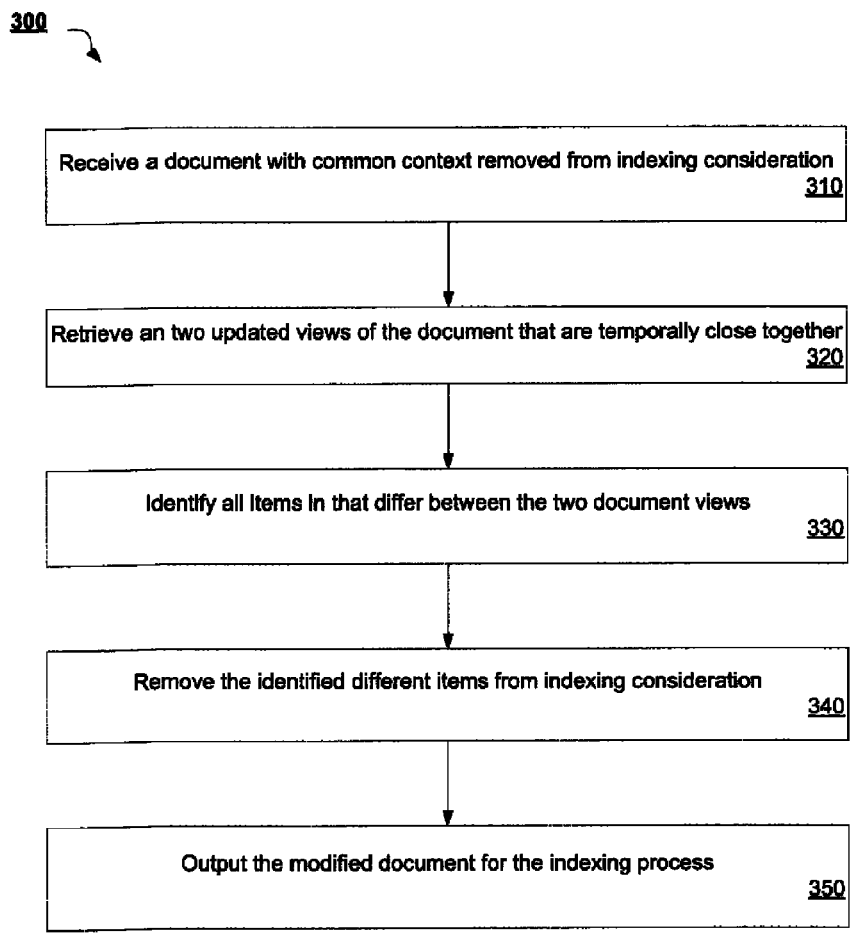
FIG. 3 is a flow diagram illustrating a method for separating content from noisy context with temporal self-comparison of a template-based document according to an embodiment of the invention.

FIG. 3 is a flow diagram illustrating a method 300 for separating content from noisy context with temporal self-comparison of a template-based document according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by server computing device 105 of FIG. 1.

In one embodiment, method 300 is performed as part of method 200 described with respect to FIG. 2. For instance, method 300 may be initialized subsequent to block 260 of FIG. 2, but prior to block 270. In one embodiment, method 300 provides additional noisy context removal from documents in addition to that provided by the document comparison of method 200. This second comparison of method 300 may be done temporally among each of the documents themselves to reduce per-page-view differences.

Method 300 begins at block 310, where a document is received with common context (as compared to other similar documents) removed from indexing consideration. In one embodiment, the document is a web page. Then, at block 320, two updated page views of the document are retrieved. In one embodiment, the retrieval of the updated page views in done in close temporal relation to one another. For example, the two page views may be retrieved within ten seconds of one another.

Subsequently, at block 330, the two retrieved page views are compared to identify all items that are different between the two page views. In one embodiment, this temporal self-comparison reveals any changes related to bookkeeping features of the particular document that may not have been identified by method 200. For instance, advertisements, advertisement URLs, tracking numbers, hit counts, page generation info, session ID, and so on, may differ from one page view to the next. For example, comparing the page http://www.livejournal.com/ with a copy of the page fetched 10 seconds later shows differences on eleven lines. These differences should be accounted for on temporal self-comparisons of each individual page, further reducing the amount of content on a page that should be considered relevant.

In some embodiments, block 330 may be repeated multiple times to identify if the differing content should not be removed. For instance, certain high-traffic blogs are frequently posted with comments. Multiple self-comparisons may identify such comments and prevent their removal from indexing consideration. At block 340, all identified different items on the document are removed from indexing consideration in further index processing. Lastly, at block 350, the modified document with noisy context removed is provided to an indexing process for further processing.

Figure 4:
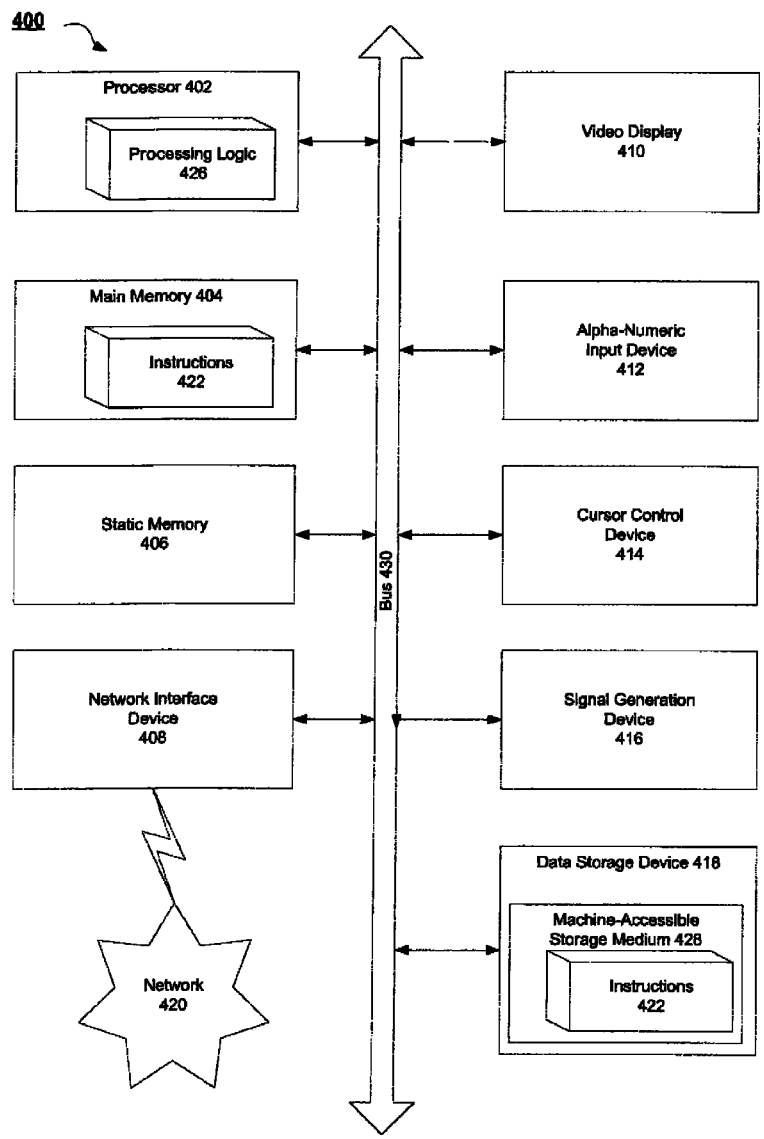
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform methods 200 and 300 to provide separation of content from noisy context in template-based documents for search indexing as described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
   selecting, by a processing device, a plurality of documents for comparison;
   identifying, by the processing device, an identical element comprising information common to each of the plurality of documents; and
   removing, by the processing device, the identical element from each of the plurality of documents to form modifications to the plurality of documents, prior to a subsequent indexing process of the plurality of documents.

2. The method of claim 1, wherein the plurality of documents are web pages.

3. The method of claim 1, wherein selecting the plurality of documents is based on at least one of occupying a same Uniform Resource Locator (URL) space or location on a same computer.

4. The method of claim 1, wherein the identical element comprises at least one of an advertisement, a site navigation component, a header, a footer, or a copyright notice.

5. The method of claim 1, further comprising, for each document of the plurality of documents:
   retrieving a plurality of updated views of the document;
   identifying an item that differs between the plurality of updated views of the document; and
   removing the item from consideration prior to the subsequent indexing process of the plurality of documents.

6. The method of claim 1, wherein the selecting, identifying, and removing are performed by the processing device of a web search engine as a pre-processing step for the indexing process.

7. The method of claim 1, further comprising retrieving the plurality of documents via a network interface of a computer.

8. A computer system comprising:
   a memory; and
   a processing device coupled to the memory, the processing device to:
      identify an identical element comprising information common to each of the plurality of documents; and
      remove the identical element from each of the plurality of documents to form modifications to the plurality of documents, prior to a subsequent indexing process of the plurality of documents.

9. The computer system of claim 8, wherein the plurality of documents are web pages.

10. The computer system of claim 8, wherein the plurality of documents are selected based on at least one of occupying a same Uniform Resource Locator (URL) space or location on a same computer.

11. The computer system of claim 8, wherein the identical element comprises at least one of an advertisement, a site navigation component, a header, a footer, or a copyright notice.

12. The computer system of claim 8, the processing device, for each document of the plurality of documents, to:
   retrieve a plurality of updated views of the document;
   identify an item that differs between the plurality of updated views of the document; and
   remove the item from consideration prior to the subsequent indexing process of the plurality of documents.

13. The computer system of claim 12, wherein the selecting, identifying, and removing are performed by a web search engine as a pre-processing step for the indexing process.

14. The computer system of claim 8, the memory to store the plurality of documents.

15. A non-transitory machine-readable storage medium programmed to include instructions executable by a processing device to cause the processing device to perform operations comprising:
   selecting, by the processing device, a plurality of documents for index comparison;
   identifying, by the processing device, an identical element comprising information common to each of the plurality of documents; and
   removing, by the processing device, the identical element from each of the plurality of documents to form modifications to the plurality of documents, prior to a subsequent indexing process of the plurality of documents.

16. The non-transitory machine-readable storage medium of claim 15, wherein the plurality of documents are web pages.

17. The non-transitory machine-readable storage medium of claim 15, wherein the plurality of documents have at least a same Uniform Resource Locator (URL) space or are located on a same computer.

18. The non-transitory machine-readable storage medium of claim 15, wherein the identical element comprises at least one of an advertisement, a site navigation component, a header, a footer, or a copyright notice.

19. (C) The non-transitory machine-readable storage medium of claim 15, further comprising, for each document of the plurality of documents:
   retrieving a plurality of updated views of the document;
   identifying an item that differs between the plurality of updated views of the document; and
   removing the item from consideration prior to the subsequent indexing process of the plurality of documents.

20. The non-transitory machine-readable storage medium of claim 15, wherein the selecting, identifying, and removing are performed by a web search engine as a pre-processing step for the indexing process.

* * * * *